C. SCHWEINLE.
CONTROL FOR REFRIGERATING APPARATUS.
APPLICATION FILED FEB. 25, 1918.
1,325,756.
Patented Dec. 23, 1919.
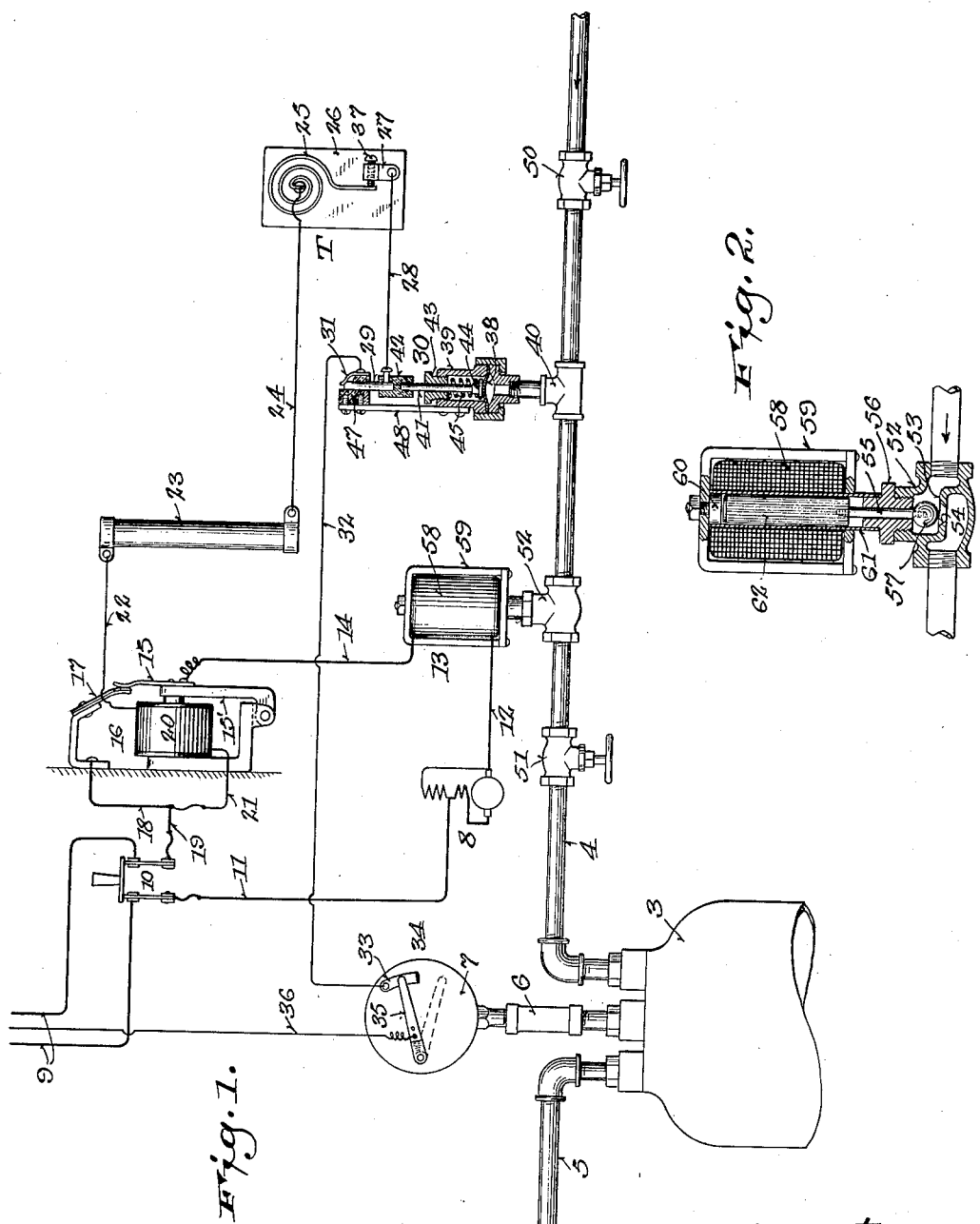

UNITED STATES PATENT OFFICE.

CHARLES SCHWEINLE, OF MILWAUKEE, WISCONSIN, ASSIGNOR TO SANITARY REFRIGERATING MACHINERY COMPANY, OF MILWAUKEE, WISCONSIN, A CORPORATION OF WISCONSIN.

CONTROL FOR REFRIGERATING APPARATUS.

1,325,756.  Specification of Letters Patent.  Patented Dec. 23, 1919.

Application filed February 25, 1918. Serial No. 219,007.

*To all whom it may concern:*

Be it known that I, CHARLES SCHWEINLE, a citizen of the United States, and resident of Milwaukee, in the county of Milwaukee and State of Wisconsin, have invented new and useful Improvements in Controls for Refrigerating Apparatus, of which the following is a description, reference being had to the accompanying drawings, which are a part of this specification.

The invention relates to control mechanism for refrigerating apparatus.

One object of the invention is to automatically control the motor, which furnishes the power to the apparatus, by means of an electric switch whose operation is dependent upon the action of a thermostat placed in the container to be cooled also upon the pressure of the condenser cooling fluid in the refrigerating apparatus and upon the pressure of the refrigerant in the condenser. In other words if the temperature of the container goes below a certain point the operation of the thermostat causes the opening of the motor control switch and a consequent stopping of the motor, or if the pressure of the condenser cooling fluid in the apparatus should drop down below working pressure or should be shut off the motor control switch would be opened to stop the motor, or if the pressure of the refrigerant in the condenser became too high the control switch would be opened to stop the motor.

Another object of the invention is to provide means for automatically shutting off or turning on the condenser cooling liquid when the motor is stopped or started.

Another object of the invention is to provide a simple control system in which the motor and electrically controlled switch are in the work circuit and in which the electrical means for controlling the switch is in a control circuit in shunt with the work circuit and which control circuit includes a thermostatically controlled switch, a fluid pressure controlled switch and a refrigerant pressure controlled switch.

The invention further consists in the several features hereinafter set forth.

In the drawings; Figure 1 is a view of a specific embodiment of the invention showing it connected up with the condenser and the fluid cooling system for the condenser, the fluid pressure control switch being shown in section;

Fig. 2 is a vertical sectional view through the electrically operated valve in the fluid cooling system.

In the drawings, the numeral 3 designates the usual condenser, 4 the water inlet pipe for conducting the cooling water to the condenser, 5 the water outlet, 6 a gage pipe communicating with the refrigerant chamber or conduit, 7 a pressure gage of any suitable construction, and 8 the motor for driving the compressor, not shown.

Current is supplied to the motor from one side of the line 9 through a knife switch 10 and conductor 11, the current passing from the motor through a conductor 12 to a water control valve 13, hereinafter described, and from thence through a conductor 14 to the movable contact 15 of an electrically operated switch 16 and thence through the fixed contact 17 of said switch through conductors 18 and 19 to the switch 10 and thence to the other side of the line 9. The circuit just described will be termed the "work circuit."

The switch 16 consists of the contacts 15 and 17 just described, a gravity actuated pivoted switch arm 15' upon which the contact 15 is mounted and an electro-magnet 20, the armature of which is the contact carrying member 15'.

This switch is electrically controlled by a control circuit in which said magnet 20 is located and which circuit is in shunt with the work circuit. This circuit includes a conductor 21 leading from the conductor 19 to one terminal of the magnet 20, the other terminal of said magnet being connected through a conductor 22 to a resistance unit 23 which is connected by a conductor 24 to the thermostat coil 25 of a thermostat T which coil is mounted on a base 26 carrying a fixed contact 27 connected by a conductor 28 to the movable contact 29 of a pressure operated switch 30 having a fixed contact 31 connected by a conductor 32 to a fixed contact 33 of the refrigerant pressure switch 34 on the gage 7, the movable contact 35 of which is connected to a return conductor 36. The resistance unit is placed in the control circuit so as to cut down the current flowing through the thermostat and prevent injury to it. The fixed contact 27 of the thermostat T is provided with an adjustable screw 37 coöperating with the lower end of the coil 25 to close the circuit through the thermostat at a predetermined temperature. The thermostat as is usual in devices of this kind is adapted to be inserted in the ice box or other cooling container and a rise in temperature therein establishes contact between the coil 25 and screw 37 and a drop in temperature below a predetermined value causes a separation of said contacts by the movement of the lower end of the coil 25 away from the contact screw. Thus when the cooling temperature is established and the coil 25 moves out of contact with contact 27 the control circuit is open which deënergizes the magnet 20 and causes the arm 15 of the switch 16 to swing out to some extent to separate the contacts 15 and 17 and thus open the work circuit and stop the motor 8.

The pressure operated switch consists of a diaphragm 38 mounted in a casing 39 which communicates at its lower end with the inlet pipe 4 through a pipe connection 40, said diaphragm acting upon a rod 41 connected by an insulating member 42 to the movable contact 29. The sliding actuating rod 41 passes through a screw plug 43 in the casing 39 and its headed end 44 rests upon the diaphragm 38. The diaphragm is normally held against movement by a spring 45, inclosed within the casing and interposed between the plug 43 and the head 44. The fixed contact 31 of the flexible type is mounted in an insulating block 47 carried by a support 48 secured to the casing 39. The movable contact 29 slides, within an aperture in the block 47, into and out of contact with the contact 31. In the pipe 4 is a shut off valve 50 and a pressure regulating valve 51. When the valve 50 is opened the water flowing through the pipe 4 acts against the diaphragm and overcomes the action of the spring 45 to move the rod 41 upwardly to close the circuit between the contacts 29 and 31. If the valve is shut off the spring 45 will move the rod 41 down to separate the contacts and if for any reason the pressure of the cooling water falls below working pressure the spring 45 also moves the rod 41 down to separate the contacts. Thus the switch 30 is closed when the cooling water is circulating under working pressure but should the pressure drop to any extent or cease the pressure valve causes the switch to move to open position and thus open the control circuit which will deënergize the magnet 20 and cause the arm 15 of the switch 16 to swing out to a limited extent separating the contacts 15 and 17 and thus opening the work circuit and stopping the motor 8.

The water valve comprises a fitting 52 in the pipe 4 having a web section 53 provided with an aperture 54 having tapered sides forming a valve seat, a stem 55 slidably mounted in a plug 56 and carrying a valve head 57 adapted to register with the seat to shut off the water and electrically operated means for operating said valve.

The electrical means for operating the valve comprises a solenoid having a coil 58 mounted on a frame 59 provided with a plug 60 seated in the upper end of a sleeve 61 on the plug 56 and a laminated core 62 secured to the stem 55. One terminal of the coil 58 is connected to the conductor 12 and the other to the conductor 14 of the work circuit. Thus when current is flowing through the work circuit the coil 58 is energized and the valve is opened by the movement of the core 62 to its upper position and said valve is kept open while the circuit is closed and the motor is operating to allow the cooling water to pass through the pipe 4. On the opening of the work circuit, the coil 58 is deënergized and the weight of the core 62 moves it and the valve stem down to bring the head 57 into register with the aperture 54 and thus shut off the water to the condenser.

The safety gage switch or refrigerant pressure switch consists of the fixed contact 33 and movable contact or switch arm 35 which is connected to the pressure responsive member (not shown) of the gage 7 and moved by it under excessive pressure out of engagement with the contact 33 so that if for any reason the refrigerant pressure should rise above a safe working pressure the opening of this switch will open the control circuit, deënergize magnet 20, open switch 16 and thus stop the motor 8.

In the construction above described when it is desired to start the refrigerating machine the switch 10 is thrown in and the valves 50 and 51 opened and the water passes into the pipe 4 as far as the valve 52. Thereupon the pressure of the water acting against the diaphragm 38 raises the rod 41, closes the switch 30 as previously described, energizes the magnet 20 which draws its armature 15′ inwardly closing the switch 16 whereby the current flows through the work circuit operating the motor which drives the compressor and also operating valve-head 57 to allow the water to pass to the condenser and then out the pipe 5.

If now for any reason the water pressure should decrease below working pressure the diaphragm 38 moves back and the rod 41 moves down opening the switch 30 and stopping the motor and consequently the operation of the compressor as previously described.

With the apparatus running as soon as the receptacle or chest is cooled to the desired temperature, the coil 25 of the thermostat T moves away from the contact 27 opening this switch and stopping the motor and consequently the operation of the compressor as previously described. As soon as the temperature in the receptacle or chest being cooled increases, the control circuit is again automatically closed by the thermostatic switch and the magnet 20 then operates to close the switch 16 and the motor is again started.

If now for any reason the pressure of the refrigerant in the condenser becomes excessive the pressure responsive member of the gage 7 moves the arm 35 out of contact with the contact 33 opening the control circuit which as previously described stops the motor.

While the motor 8 is running the water valve 13 is kept open by the energization of the coil 58 but when the control circuit is opened by either of the switches T, 30 or 34 and the work circuit thereby opened, the water valve closes and shuts off the supply of cooling water.

The invention thus exemplifies a construction in which the operation of the machine is controlled by the thermostat, by the variation in pressure of the water in the cooling system and by excessive pressure of the refrigerant.

I am aware that the details of construction herein shown and described are capable of some modification and change and therefore desire it to be understood that such changes in construction as come within the scope of the appended claim I deem to be within the spirit of my invention.

What I claim as my invention is:

In a refrigerating apparatus having a refrigerant cooling system, a water inlet-pipe for conducting the cooling water to the condenser, a water control valve in said inlet-pipe, and a water pressure operated means connected also to said water inlet-pipe, a work circuit including an electrical means for operating said water control valve, also a motor for driving the compressor, and a single-contact switch for controlling the work circuit, and a single control circuit having connected in series a magnet for directly controlling said single-contact switch of the work circuit, a thermostatic switch, a refrigerant pressure switch, and a switch operated by said water pressure operated means, all of said switches in the control circuit being of the single contact type which are operable only in one direction to close the single control circuit.

In testimony whereof I affix my signature.

CHARLES SCHWEINLE.